(12) United States Patent
Bacher et al.

(10) Patent No.: US 12,199,940 B1
(45) Date of Patent: *Jan. 14, 2025

(54) ADDRESS RESOLUTION PROTOCOL BASED DEPLOYMENT

(71) Applicant: International Business Machines Corporation, Armonk, NY (US)

(72) Inventors: Utz Bacher, Dettenhausen (DE); Michael Behrendt, Sindelfingen-Maichingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/334,803

(22) Filed: Jun. 14, 2023

(51) Int. Cl.
*H04L 61/103* (2022.01)

(52) U.S. Cl.
CPC .................................. *H04L 61/103* (2013.01)

(58) Field of Classification Search
CPC ..................................................... H04L 61/103
See application file for complete search history.

(56) References Cited

U.S. PATENT DOCUMENTS

| | | | |
|---|---|---|---|
| 8,336,047 B2 | 12/2012 | Van Hensbergen | |
| 9,973,468 B2* | 5/2018 | Nath | H04L 61/103 |
| 10,616,179 B1 | 4/2020 | Mccarriar | |
| 10,911,397 B2* | 2/2021 | Chandrashekhar | H04L 45/586 |
| 10,911,398 B2 | 2/2021 | Wei | |
| 10,931,745 B2* | 2/2021 | Zhou | H04L 61/5007 |
| 11,237,858 B2 | 2/2022 | Wu | |
| 11,558,246 B2* | 1/2023 | Krug | H04L 41/0806 |
| 11,968,169 B1* | 4/2024 | Bacher | H04L 61/4511 |
| 2014/0207834 A1* | 7/2014 | Cherian | H04L 67/51 707/827 |
| 2016/0173440 A1 | 6/2016 | Stahura | |
| 2017/0295131 A1 | 10/2017 | Dyszynski | |
| 2018/0115582 A1 | 4/2018 | Thakar | |
| 2018/0205734 A1 | 7/2018 | Wing | |

(Continued)

FOREIGN PATENT DOCUMENTS

| | | |
|---|---|---|
| CN | 112311907 A | 2/2021 |
| WO | 2015066912 A1 | 5/2015 |

OTHER PUBLICATIONS

Choi et al, "An Adaptive Resource Provisioning Method Using Job History LEarning Technique in Hybrid Infrastructure", IEEE 1st International Workshops on Foundations and Applications of Self Systems, Sep. 12, 2016, IEEE Publishing.*

(Continued)

*Primary Examiner* — Todd L Barker
(74) *Attorney, Agent, or Firm* — Randy Tejeda

(57) ABSTRACT

One or more computer processors receive an address resolution protocol (ARP) request in response to a client connecting to a compute resource. The one or more computer processors identify an internet protocol (IP) address associated with the ARP request and the compute resource. The one or more computer processors determine the compute resource is unavailable or not ready for a connection with the client utilizing the identified IP address. The one or more computer processors, responsive to determining that the compute resource is unavailable, provision and deploy a new compute resource, wherein the new compute resource is available to the client under the identified IP address.

20 Claims, 2 Drawing Sheets

(56) References Cited

U.S. PATENT DOCUMENTS

| | | |
|---|---|---|
| 2019/0036868 A1* | 1/2019 | Chandrashekhar ... H04L 45/021 |
| 2020/0076686 A1* | 3/2020 | Krug ........................ H04L 45/74 |
| 2021/0226913 A1 | 7/2021 | Sinha |
| 2022/0182246 A1 | 6/2022 | Murphy |
| 2022/0217176 A1 | 7/2022 | Holloway |
| 2022/0286515 A1 | 9/2022 | Quinn |
| 2023/0308297 A1 | 9/2023 | Sangamesh |

OTHER PUBLICATIONS

Fishman et al., "HRX: Virtualizing the Cloud", HotCloud'13, Jun. 25, 2013.*

Rathod et al., "NDynamic Framework for Secure VM Migration over Cloud Computing", Journal of Information Processing Systems, vol. 13, No. 3, pp. 476-490, Jun. 2017.*

Gunleisfsen et al., "A Proof-of-Concept Demonstration of Isolated and Encrypted Service Function Chains" Aug. 24, 2019.*

Majumder, S., "Configuring ARP response Suppression for Virtual IP addresses (VIPs)," Sep. 21, 2020, 3 pages. https://docs.citrix.com/en-us/citrix-adc/current-release/networking/ip-addressing/configuring-citrix-adc-owned-ip-addresses/configuring-arp-response-suppression-for-vips.html.

Utz et al., "Domain Name Based Deployment," U.S. Appl. No. 18/334,833, filed Jun. 14, 2023, IBM.

"List of IBM Patents or Patent Applications Treated as Related", Filed herewith, 2 pages.

* cited by examiner

ADDRESS RESOLUTION PROTOCOL BASED DEPLOYMENT

BACKGROUND

The present invention relates generally to the field of networking, and more particularly to address resolution protocol based deployment.

The address resolution protocol (ARP) is a communication protocol used for discovering the link layer address, such as a media access control (MAC) address, associated with a given internet layer address, typically an IPV4 address. This mapping is a critical function in the Internet protocol suite. The address resolution protocol is a request-response protocol. Its messages are directly encapsulated by a link layer protocol. It is communicated within the boundaries of a single network, never routed across internetworking nodes. The address resolution protocol uses a simple message format containing one address resolution request or response. The packets are carried at the data link layer of the underlying network as raw payload. The size of the address resolution protocol message depends on the link layer and network layer address sizes. The message header specifies the types of networks in use at each layer as well as the size of addresses of each. The message header is completed with the operation code for request (1) and reply (2). The payload of the packet consists of four addresses, the hardware and protocol address of the sender and receiver hosts.

SUMMARY

Embodiments of the present invention disclose a computer-implemented method, a computer program product, and a system. The computer-implemented method includes one or more computer processors receiving an address resolution protocol (ARP) request in response to a client connecting to a compute resource. The one or more computer processors identify an internet protocol (IP) address associated with the ARP request and the compute resource. The one or more computer processors determine the compute resource is unavailable for a connection with the client utilizing the identified IP address. The one or more computer processors, responsive to determining that the compute resource is unavailable, provision and deploy a new compute resource, wherein the new compute resource is available to the client under the identified IP address.

BRIEF DESCRIPTION OF THE DRAWINGS

Figure (i.e., FIG. 1 is a functional block diagram illustrating a computing environment, in accordance with an embodiment of the present invention.

DETAILED DESCRIPTION

Figure 1:
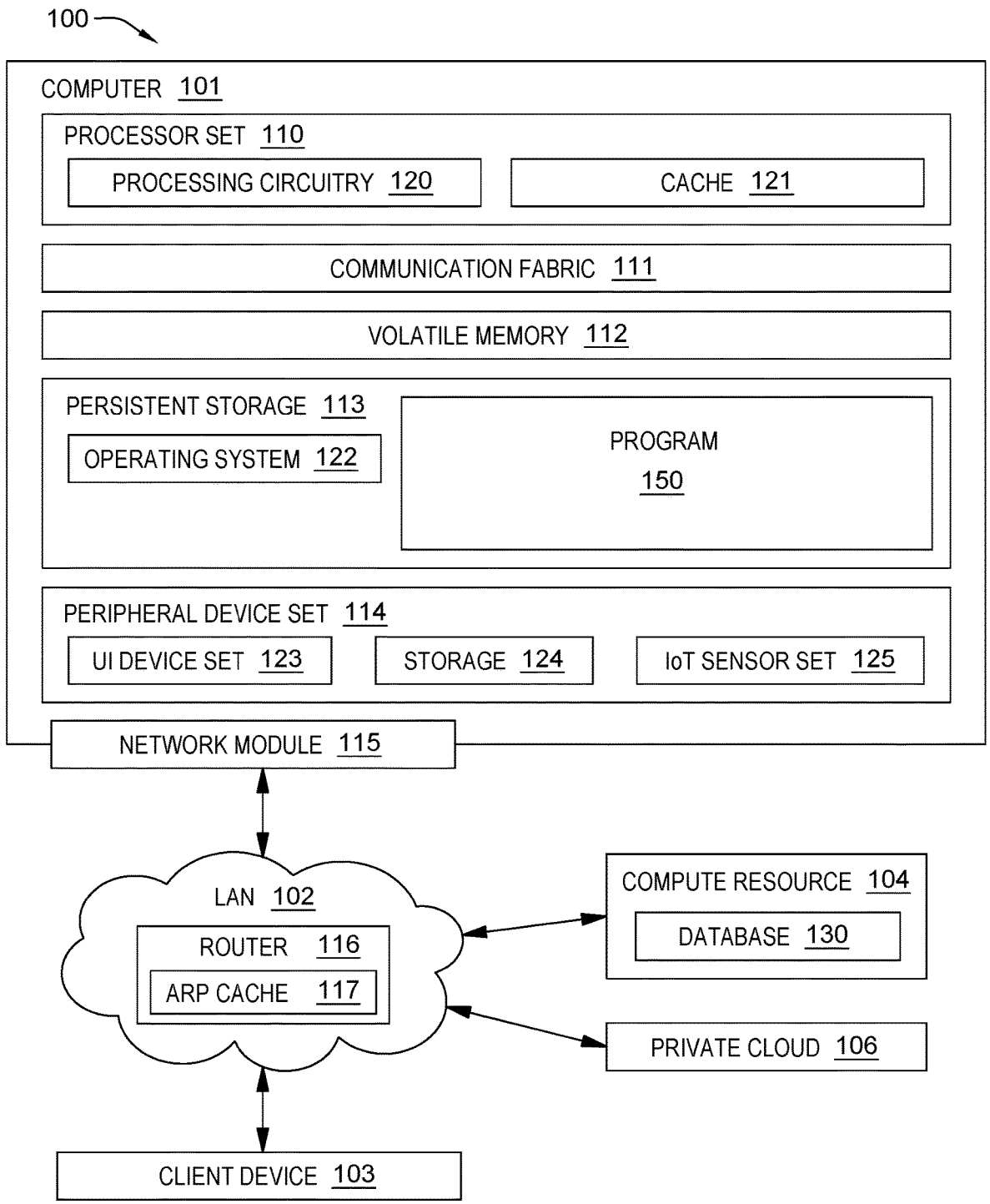

According to an aspect of the invention, there is provided a computer-implemented method comprising: receiving an address resolution protocol (ARP) request in response to a client connecting to a compute resource; identifying an internet protocol (IP) address associated with the ARP request and the compute resource; determining the compute resource is unavailable or not ready for a connection with the client utilizing the identified IP address; and responsive to determining that the compute resource is not available or not ready, provisioning and deploying a new compute resource, where the new compute resource is available to the client under the identified IP address. Such an aspect of the invention has a technical effect of protocol agonistic provisioning of an on-demand compute resource. Such an aspect of the invention has a technical advantage of computational network resource reduction by preventing connection failures between the client and the unavailable compute resource.

In embodiments, the method may further comprise a synchronize (SYN) request of a client triggers the ARP resolution request. Such an embodiment has a technical effect of responding to the client initiating a connection to the compute resource.

In embodiments, the method may further comprise identifying the IP address associated with the compute resource comprises utilizing a maintained ARP cache that contains one or more mappings of compute resources, respective IP addresses, and respective media access control addresses. Such an embodiment has a technical advantage of improving IP identification of compute resources.

In embodiments, the method may further comprise instructing a router to withhold internet control message protocol packets directed back to an originator that triggered the ARP resolution request. Such an embodiment has a technical advantage of reducing computational resources as the new compute is provisioned.

In embodiments, the method of provisioning and deploying the new compute resource may further comprise instructing a router to discard one or more ARP responses until the new compute resource responds with a positive health check. Such an embodiment has a technical advantage of reducing computational resources as the new compute is provisioned.

In embodiments, the method may further comprise the compute resource selected from a group consisting of a virtual server, a container, a cluster of containers, and a cluster of virtual servers. Such an embodiment has a technical effect of on-demand provisioning and deployment of one or more virtual servers or one or more containers.

In embodiments, the method may further comprise deprovisioning the new compute resource responsive to the connection with the client ceasing. Such an embodiment has a technical effect of releasing computational resources dedicated to the new compute resource when not in use.

In embodiments, the method may further comprise deprovisioning initiates responsive to a timer expiring; and the timer starts in response to a ceasing connection between the client and the new compute resources. Such an embodiment has a technical effect of releasing computational resources dedicated to the new compute resource when not in use.

In embodiments, the method may further comprise, responsive to an available and ready new compute resource, forwarding the ARP request to the new compute resource and establishing a connection with the client and the new compute resource. Such an embodiment has a technical effect of initiating a connection between the provisioned compute resource and the client.

In embodiments, the method may further comprise instructing a router to withhold one or more transmission control protocol reset packets directed back to an originator that transmitted the ARP request. Such an embodiment has a technical advantage of reducing computational resources as the new compute is provisioned.

According to an aspect of the invention, there is provided a computer program product comprising one or more computer readable storage media having computer-readable program instructions stored on the one or more computer readable storage media, said program instructions executes a computer-implemented method comprising steps of receiving an address resolution protocol (ARP) request in response to a client connecting to a compute resource; identifying an internet protocol (IP) address associated with the ARP request and the compute resource; determining the compute resource is unavailable for a connection with the client utilizing the identified IP address; and responsive to determining that the compute resource is unavailable ready, provisioning and deploying a new compute resource, where the new compute resource is available to the client under the identified IP address. Such an aspect of the invention has a technical effect of protocol agonistic provisioning of an on-demand compute resource. Such an aspect of the invention has a technical advantage of computational network resource reduction by preventing connection failures between the client and the unavailable compute resource.

In embodiments, the computer program product may further comprise the step of a synchronize (SYN) request of a client triggers the ARP resolution request. Such an embodiment has a technical effect of responding to the client initiating a connection to the compute resource.

In embodiments, the computer program product may further comprise the step of instructing a router to withhold internet control message protocol packets directed back to an originator that triggered the ARP resolution request. Such an embodiment has a technical advantage of reducing computational resources as the new compute is provisioned.

In embodiments, the computer program product may further comprise the step of deprovisioning the new compute resource responsive to the connection with the client ceasing. Such an embodiment has a technical advantage of reducing computational resources as the new compute is provisioned.

According to an aspect of the invention, there is provided a one or more computer processors; one or more computer readable storage media having computer readable program instructions stored on the one or more computer readable storage media for execution by at least one of the one or more processors, the stored program instructions execute a computer-implemented method comprising steps of receiving an address resolution protocol (ARP) request in response to a client connecting to a compute resource; identifying an internet protocol (IP) address associated with the ARP request and the compute resource; determining the compute resource is unavailable for a connection with the client utilizing the identified IP address; and responsive to determining that the compute resource is unavailable or not ready, provisioning and deploying a new compute resource, where the new compute resource is available to the client under the identified IP address. Such an aspect of the invention has a technical effect of protocol agonistic provisioning of an on-demand compute resource. Such an aspect of the invention has a technical advantage of computational network resource reduction by preventing connection failures between the client and the unavailable compute resource.

In embodiments, the computer system may further comprise the step of a synchronize (SYN) request of a client triggers the ARP resolution request. Such an embodiment has a technical effect of responding to the client initiating a connection to the compute resource.

In embodiments, the computer system may further comprise the step of instructing a router to withhold internet control message protocol packets directed back to an originator that triggered the ARP resolution request. Such an embodiment has a technical advantage of reducing computational resources as the new compute is provisioned.

In embodiments, the computer system may further comprise the step of instructing a router to discard one or more ARP responses until the new compute resource responds with a positive health check. Such an embodiment has a technical advantage of reducing computational resources as the new compute is provisioned.

In embodiments, the computer system may further comprise the step of deprovisioning the new compute resource responsive to the connection with the client ceasing. Such an embodiment has a technical effect of releasing computational resources dedicated to the new compute resource when not in use.

In embodiments, the computer system may further comprise the step of the compute resource selected from a group consisting of a virtual server, a container, a cluster of containers, and a cluster of virtual servers. Such an embodiment has a technical effect of on-demand provisioning and deployment of one or more virtual servers or one or more containers.

Additionally or alternatively, an embodiment in which a computer-implemented method comprises receiving an address resolution protocol (ARP) request in response to a client connecting to a compute resource; identifying an internet protocol (IP) address associated with the ARP request and the compute resource; determining the compute resource is unavailable or not ready for a connection with the client utilizing the identified IP address; and responsive to determining that the compute resource is not available or not ready, provisioning and deploying a new compute resource, where the new compute resource is available to the client under the identified IP address, includes instructing a router to withhold one or more transmission control protocol reset packets directed back to an originator that transmitted the ARP request, has a technical effect of protocol agonistic provisioning of an on-demand compute resource and a technical advantage of computational network resource reduction by preventing connection failures between the client and the unavailable compute resource.

Additionally or alternatively, an embodiment in which a computer-implemented method comprises receiving an address resolution protocol (ARP) request in response to a client connecting to a compute resource; identifying an internet protocol (IP) address associated with the ARP request and the compute resource; determining the compute resource is unavailable or not ready for a connection with the client utilizing the identified IP address; responsive to determining that the compute resource is not available or not ready, provisioning and deploying a new compute resource, where the new compute resource is available to the client under the identified IP address, includes deprovisioning the new compute resource responsive to the connection with the client ceasing, has a technical effect of protocol agonistic provisioning of an on-demand compute resource and a technical effect of releasing computational resources dedicated to the provisioned compute resource when not in use.

Additionally or alternatively, an embodiment in which a computer-implemented method comprises receiving an address resolution protocol (ARP) request in response to a client connecting to a compute resource; identifying an internet protocol (IP) address associated with the ARP request and the compute resource; determining the compute resource is unavailable or not ready for a connection with the client utilizing the identified IP address; responsive to determining that the compute resource is not available or not ready, provisioning and deploying a new compute resource, where the new compute resource is available to the client under the identified IP address, includes instructing a router to withhold internet control message protocol packets directed back to an originator that triggered the ARP resolution request, has a technical effect of protocol agonistic provisioning of an on-demand compute resource and a technical advantage of computational network resource reduction by preventing connection failures between the client and the unavailable compute resource.

In an exemplary technical use case, a client device attempts to connect to a virtual server or container (i.e., compute resource) comprising a database. A router receives a SYN packet from the client device and responsively transmits an ARP request to determine the IP address of the virtual server or container. The present invention may determine that the compute resource associated with the IP address is unavailable or not ready to connect with the client device. The present invention may provision or initiate a provisioning of a new compute resource. While the new compute resource is provisioning, the present invention monitors the new compute resource and instructs an associated router to hold or discard ARP responses, ICMP, and/or RST packets; preventing failed connection transmissions back to the client device. When the present invention determines the new compute is available, the present invention may instruct the router to return to normal (i.e., allow sequent ARP responses, ICMP, and/or RST packets). Responsively, the present invention may facilitate a connection between the client device and the new compute resource. The present invention may deprovision the new compute resource responsive to the connection between the client device and the new compute resource ceasing.

Traditionally, systems that implement a serverless paradigm attempt to provision compute resources as needed. In this paradigm, incoming requests should deploy resources such that one or more requests can be responded to. While traditional load balancers are able to accomplish this, said load balance require protocol awareness, leading to complex configurations and wasted computational resources. Further, said balancers easily form network bottlenecks and require constant management which in turn requires substantial computation resources. In addition, load balancers can become a single point-of-failure which introduced significant network delays; if taken down and security risks if compromised.

Embodiments of the present invention allow for a scalable, protocol agonistic solution to the serverless paradigm by provisioning, on-demand compute resources based on client demand and protocol usage. Embodiments of the present invention can be distributed amongst a plurality of routers and/or network gateways, thus solving the single point-of-failure issue associated with traditional systems. Some embodiments of the present invention recognize that the serverless paradigm is improved through the reduction of required computational resources by address resolution protocol based deployment. Implementation of embodiments of the invention may take a variety of forms, and exemplary implementation details are discussed subsequently with reference to the Figures.

The present invention will now be described in detail with reference to the Figures.

FIG. 1 depicts computing environment 100 illustrating components of computer 101 in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation, or garbage collection, but this does not render the storage device as transitory because the data is not transitory while it is stored.

Computing environment 100 contains an example of an environment for the execution of at least some of the computer code involved in performing the inventive methods, such as address resolution protocol deployer code, hereinafter program 150. In addition to program 150, computing environment 100 includes, for example, computer 101, local area network (LAN) 102, client device 103, compute resource 104, and public cloud 105. In this embodiment, computer 101 includes processor set 110 (including processing circuitry 120 and cache 121), communication fabric 111, volatile memory 112, persistent storage 113 (including operating system 122 and program 150, as identified above), peripheral device set 114 (including user interface (UI), device set 123, storage 124, and Internet of Things (IoT) sensor set 125), and network module 115. In an embodiment, compute resource 104 includes database 130.

Private cloud 106 includes a gateway, a cloud orchestration module, a host physical machine set, a virtual machine set, and a container set.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip". In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in program 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through LAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be down-loaded to computer 101 from an external computer or external storage device through a network adapter card or network interface included in network module 115.

LAN 102 is any local area network (LAN) designed to communicate data between devices located in a local area, such as a Wi-Fi network. In some embodiments, the WAN may be replaced and/or supplemented by any wide area network (WAN) (for example, the internet) capable of communicating computer data over non-local distances by any technology for communicating computer data, now known or to be developed in the future. The WAN and/or LANs typically include computer hardware such as copper transmission cables, optical transmission fibers, wireless transmission, routers, firewalls, switches, gateway computers and edge servers. In the depicted embodiment, LAN 102 is comprised of router 116 is a device that connects two or more packet-switched networks or subnetworks. Router 116 manages network traffic between one or more networks by forwarding data packets to intended IP addresses and allowing multiple devices to use the same Internet connection (e.g., WAN). In the depicted embodiment, router 116 contains address resolution protocol (ARP) cache 117. ARP cache 117 is comprised of one or more ARP entries that are created, by router 116 or program 150, when an internet protocol (IP) address is resolved to a media access control (MAC) address.

Client device 103 is any computer system that is used and controlled by an end user (for example, a customer of an enterprise that operates compute resource 104) and may take any of the forms discussed above in connection with compute resource 104. Client device 103 typically receives helpful and useful data from the operations of compute resource 104. For example, in a hypothetical case where computer 101 is designed to provide a recommendation to an end user, this recommendation would typically be communicated from compute resource 104 through LAN 102 to a WAN to client device 103. In this way, client device 103 can display, or otherwise present, the recommendation to an end user. In some embodiments, client device 103 may be a client device, such as thin client, heavy client, mainframe computer, desktop computer and so on.

Compute resource 104 is any computer system that serves at least some data and/or functionality to computer 101. Compute resource 104 may be controlled and used by the same entity that operates computer 101. Compute resource 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from database 130 of compute resource 104.

Private cloud 106 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of private cloud 106 is performed by the computer hardware and/or software of cloud orchestration modules. The computing resources provided by private cloud 106 are typically implemented by virtual computing environments that run on various computers making up the computers of a host physical machine set, which is the universe of physical computers in and/or available to private cloud 106. The virtual computing environments (VCEs) typically take the form of virtual machines from the virtual machine set and/or containers from a container set. It is understood that these VCEs may be stored as images and may be transferred among and between the various physical machine hosts, either as images or after instantiation of the VCE. The cloud orchestration module manages the transfer and storage of images, deploys new instantiations of VCEs and manages active instantiations of VCE deployments. In an embodiment, private cloud 106 contains a gateway that is a collection of computer software, hardware, and firmware that allows private cloud 106 to communicate through LAN 102 or a WAN.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Program 150 is a program, a subprogram of a larger program, an application, a plurality of applications, or mobile application software, which functions to address resolution protocol based deployment. In an embodiment, program 150 is contained within one or more instances of router 116 or network gateways. In another embodiment, program 150 is downstream of one or more routers or network gateways and serves as a proxy in between the routers and gateways and one or more instances of compute resource 104 and/or compute resource provisioners, as detailed in the steps of FIG. 2. In various embodiments, program 150 may implement the following steps: receiving an address resolution protocol (ARP) request in response to a client connecting to a compute resource; identifying an internet protocol (IP) address associated with the ARP request and the compute resource; determining the compute resource is unavailable for a connection with the client utilizing the identified IP address; and responsive to determining that the compute resource is unavailable or not ready, provisioning and deploying a new compute resource, wherein the new compute resource is available to the client under the identified IP address. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over LAN 102. In various embodiments, client versions of program 150 resides on any other computing device (not depicted) within computing environment 100. Program 150 is depicted and described in further detail with respect to FIG. 2.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

Figure 2:
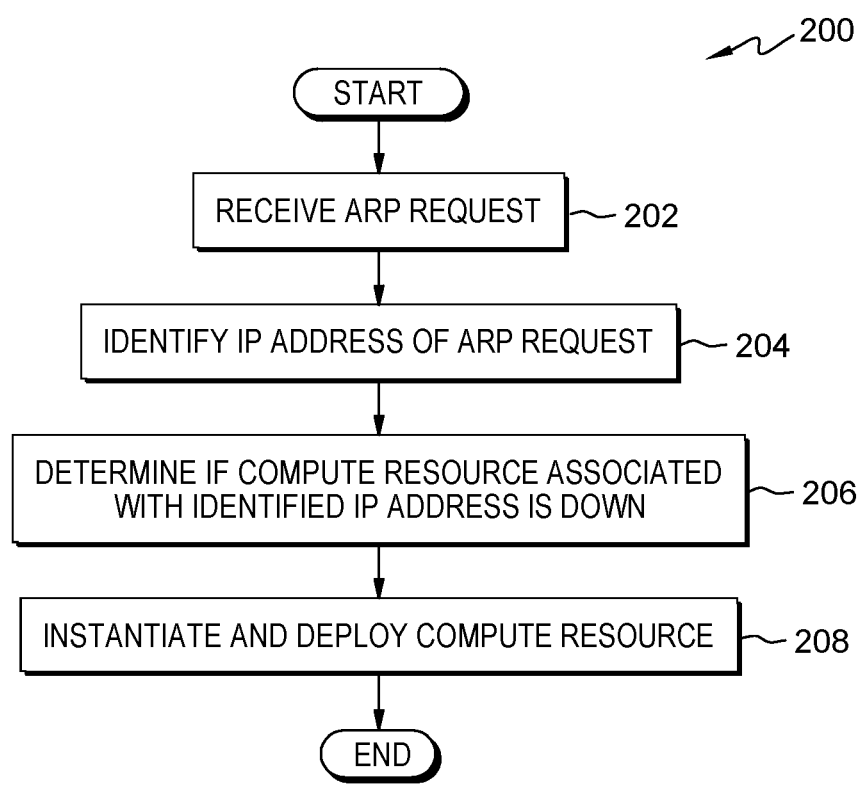
FIG. 2 is a flowchart depicting operational steps of a program, on a computer within the computing environment of FIG. 1, for address resolution protocol based deployment, in accordance with an embodiment of the present invention.

FIG. 2 depicts flowchart 200 illustrating operational steps of program 150 for address resolution protocol based deployment, in accordance with an embodiment of the present invention.

Program 150 receives an address resolution protocol (ARP) request (step 202). In an embodiment, program 150 initiates responsive to an ARP request from a network component (e.g., router 116) or from client device 103. In an embodiment, the network component or client device 103 is an originator. In one embodiment, the ARP request is triggered through a synchronize (SYN) packet from client device 103 attempting to connect compute resource 104. In an embodiment, program 150 is comprised within router 116 or in a separate system as shown in the FIG. 1. In another embodiment, program 150 initiates responsive to the ARP request, representing that client device 103 is attempting to connect compute resource 104 (e.g., virtual server, virtual machine, container, cluster of containers). In an embodiment, program 150 receives a SYN packet from client device 103 or from router 116 that forwards the SYN packet to program 150 for further processing and transmission and creates the ARP request. In another embodiment, program 150 functions as a network proxy (e.g., ARP listener) between client device 103 and router 116 or between router 116 and one or more instances of compute resource 104. In an embodiment, program 150 holds the SYN packet until compute resource 104 can be identified and/or resolved.

Program 150 identifies an Internet Protocol (IP) address of the ARP request (step 204). Program 150 identifies the IP address associated with the ARP request, where the IP address is the IP address of compute resource 104. In an embodiment, program 150 maintains a database that contains one or more mappings of one or more instances of compute resource 104, IP addresses, and MAC addresses. In another embodiment, the maintained database contains respective status flags associated with each compute resource 104, wherein a status flag indicates availability of compute resource 104. For example, the status flag indicates that compute resource 104 is offline or prohibitively overloaded with connections to initiate a subsequent connection with client device 103. In another embodiment, the status flag may include a backup compute resource 104 or another aggregated compute resource 104 capable of connecting with client device 103.

Program 150 determines if the compute resource associated with the identified IP address is down (step 206). Program 150 determines compute resource 104, associated with the identified IP address associated with the received APR request, is ready and available (i.e., up) or not ready and not available (i.e., down). In an embodiment, program 150 determines whether the compute resource associated with the ARP request is ready and available to connect to client device 103 and process subsequent data. In an embodiment, program 150 queries the database described in step 202 to identify a status flag associated with compute resource 104. In this embodiment, the status flag indicates availability of compute resource 104. In another embodiment, program 150 queries or pings the identified IP and responsive to a reply or non-reply (i.e., time-out), program 150 determines the readiness of compute resource 104.

Program 150 instantiates and/or deploys the compute resource (step 208). Responsive to a determined unavailable and/or not ready compute resource 104, program 150 instantiates compute resource 104 according to one or more definitions or requirements for compute resource 104 associated with the identified IP address. In this embodiment, program 150 instantiates and deploys compute resource 104 utilizing a resource provisioning system of private cloud 106 or a similar public cloud. In another embodiment, program 150 sends a provisioning request to one or more compute resource provisioners to create and deploy a new compute resource 104 to replace or supplant the unavailable compute resource 104. In an embodiment, program 150 instructs a provisioner (e.g., local or cloud module that creates and deploys compute resources) to setup virtual hardware; install and configure software, such as the operating system and applications; and connect the compute resource to middleware, network, and storage components. In this embodiment, provisioning encompasses all of the operations needed to create a new compute resource 104 and deploy created compute resource 104 to a desired state (i.e., capable of connecting and interacting with the client). In another embodiment, program 150 instructs a cloud provisioner to create the compute resource in order to model service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction. In another embodiment, program 150 utilizes one or more service management interfaces of a resource broker to instantiate and deploy compute resource 104. In the embodiments described in this step, compute resource 104 is made available (i.e., up) to client device 103 utilizing the IP address identified in step 204.

Responsive to the deployment of compute resource 104, program 150 monitors compute resource 104 until compute resource 104 is available for communication with client device 103. In an embodiment, program 150 transmits or forwards the ARP request from step 202 to the newly created and deployed compute resource 104 such that compute resource 104 can respond with a respective ARP response. In this embodiment, the respective ARP responsive allows router 116 to send an original packet (e.g., a SYN packet) from client device 103 to compute resource 104. In another embodiment, the ARP response is issued by program 150, enabling router 116 to send the original packet to compute resource 104. In this embodiment, the original package has been retained by router 116. In the embodiment, where program 150 and router 116 are combined within one component, program 150 retains and transmits the original packet until compute resource 104 responds with the ARP response.

In an embodiment, as the provisioner is creating and deploying compute resource 104, program 150 instructs router 116 to not transmit one or more Internet Control Message Protocol (ICMP) packets to the client device 103 (i.e., sender of the original packet). In another embodiment, program 150 intercepts any ICMP packet transmitted or directed to sender of the original packet. For example, program 150 withholds, holds back, or retains any ICMP packet to be sent to client device 103, wherein the holding back is ended when a predefined timeout has ended, or the compute resource is successfully provisioned. In these embodiments, program 150 utilizes a timeout threshold based on the computational requirements of compute resource 104, where computational requirements include memory and central processing unit (CPU) requirements, software, and hardware dependencies of compute resource 104 in addition to the computational specifications of the provisioner. In this embodiment, program 150 adjusts the timeout threshold based on historical compute resource 104 creation and deployment. In another embodiment, program 150 instructs router 116 to discard all ARP responses until deployed compute resource 104 responds with a positive health check, where the health check indicates compute resource 104 is available and ready for connections with client device 103. In this embodiment, program 150 periodically checks (e.g., queries, pings, etc.) compute resource 104 to determine whether compute resource 104 is available and ready. Responsive to a positive health check, program 150 instructs router 116 to accept ARP responses and/or releases any intercepted packets intended for compute resource 104; returning the router 116, client device 103, and compute resource 104 back to a default transmission state.

In an embodiment, program 150 instructs router 116 to withhold, discard, or block all Transmission Control Protocol (TCP) Reset (RST) packets until deployed compute resource 104 responds with a positive health check, where the health check indicates compute resource 104 is available and ready for connections with client device 103. In an embodiment, program 150 periodically checks (e.g., queries, pings) compute resource 104 to determine whether compute resource 104 is available and ready. In an embodiment, program 150 instructs router 166 to withhold RST packets directed back to an originator that transmitted the ARP request. Responsive to a positive health check, program 150 instructs router 116 to stop blocking RST packets and/or releases any intercepted packets intended for compute resource 104; returning the router 116, client device 103, and compute resource 104 back to a default transmission state.

In one embodiment, when program 150 and router 116 are in the same component or are tightly connected, program 150 updates ARP cache 117 and forwards subsequent SYN packets to the compute resource. Responsive to an available compute resource, program 150 updates ARP cache 117 to reflect any new IP address or MAC address related to the compute resource. Program 150 allows the compute resource to respond to a subsequent ARP request by router 116. In an embodiment, program 150 releases one or more SYN packets to compute resource 104, thus allowing the compute resource 104 and client device 103 to establish a connection and begin a workflow. In another embodiment, program 150 deprovisions compute resource 104 responsive to a lack of ARP requests or when the connection from client device 103 ceases. For example, after a predetermined duration or expiration timer (e.g., 5 hours), program 150 determines that client device 103 does not require an active connection to compute resource 104 and transmits a request to the provisioner to deprovision (e.g., remove, release, suspend) compute resource 104, thus allowing computational resources associated with compute resource 104 to be used in other compute resources or workflows. In an embodiment, the expiration timer starts when the connection with client device 103 ceases.

What is claimed is:

1. A computer-implemented method comprising:
   receiving an address resolution protocol (ARP) request in response to a client connecting to a compute resource;
   identifying an internet protocol (IP) address associated with the ARP request and the compute resource;
   determining the compute resource is unavailable for a connection with the client utilizing the identified IP address; and
   responsive to determining that the compute resource is unavailable, provisioning and deploying a new compute resource, wherein the new compute resource is available to the client under the identified IP address.

2. The computer-implemented method of claim 1, wherein a synchronize (SYN) request of a client triggers the ARP resolution request.

3. The computer-implemented method of claim 1, wherein identifying the IP address associated with the compute resource comprises:
   utilizing a maintained ARP cache that contains one or more mappings of compute resources, respective IP addresses, and respective media access control addresses.

4. The computer-implemented method of claim 1, further comprising:
   instructing a router to withhold internet control message protocol packets directed back to an originator that triggered the ARP resolution request.

5. The computer-implemented method of claim 1, wherein provisioning and deploying the new compute resource, further comprises:
   instructing a router to discard one or more ARP responses until the new compute resource responds with a positive health check.

6. The computer-implemented method of claim 1, wherein the compute resource is selected from a group consisting of: a virtual server, a container, a cluster of containers, and a cluster of virtual servers.

7. The computer-implemented method of claim 1, further comprising:
   deprovisioning the new compute resource responsive to the connection with the client ceasing.

8. The computer-implemented method of claim 7, wherein:
   deprovisioning initiates responsive to a timer expiring; and
   the timer starts in response to a ceasing connection between the client and the new compute resources.

9. The computer-implemented method of claim 1, further comprising:
   responsive to an available and ready new compute resource, forwarding the ARP request to the new compute resource and establishing a connection with the client and the new compute resource.

10. The computer-implemented method of claim 1, further comprising:
    instructing a router to withhold one or more transmission control protocol reset packets directed back to an originator that transmitted the ARP request.

11. A computer program product comprising:
    one or more computer readable storage media having computer-readable program instructions stored on the one or more computer readable storage media, said program instructions executes a computer-implemented method comprising steps of:
    receiving an address resolution protocol (ARP) request in response to a client connecting to a compute resource;
    identifying an internet protocol (IP) address associated with the ARP request and the compute resource;
    determining the compute resource is unavailable for a connection with the client utilizing the identified IP address; and responsive to determining that the compute resource is unavailable, provisioning and deploying a new compute resource, wherein the new compute resource is available to the client under the identified IP address.

12. The computer program product of claim 11, wherein a synchronize (SYN) request of a client triggers the ARP resolution request.

13. The computer program product of claim 11, wherein the program instructions, stored on the one or more computer readable storage media, further comprise the steps of:
 instructing a router to withhold internet control message protocol packets directed back to an originator that triggered the ARP resolution request.

14. The computer program product of claim 11, wherein the program instructions, stored on the one or more computer readable storage media, further comprise the steps of:
 deprovisioning the new compute resource responsive to the connection with the client ceasing.

15. A computer system comprising: one or more computer processors;
 one or more computer readable storage media having computer readable program instructions stored on the one or more computer readable storage media for execution by at least one of the one or more processors, the stored program instructions execute a computer-implemented method comprising steps of:
 receiving an address resolution protocol (ARP) request in response to a client connecting to a compute resource;
 identifying an internet protocol (IP) address associated with the ARP request and the compute resource;
 determining the compute resource is unavailable for a connection with the client utilizing the identified IP address; and
 responsive to determining that the compute resource is unavailable, provisioning and deploying a new compute resource, wherein the new compute resource is available to the client under the identified IP address.

16. The computer system of claim 15, wherein a synchronize (SYN) request of a client triggers the ARP resolution request.

17. The computer system of claim 15, wherein the program instructions stored on the one or more computer readable storage media, further comprise the steps of:
 instructing a router to withhold internet control message protocol packets directed back to an originator that triggered the ARP resolution request.

18. The computer system of claim 15, wherein the program instructions to provision and deploy the new compute resource, stored on the one or more computer readable storage media, comprise the steps of:
 instructing a router to discard one or more ARP responses until the new compute resource responds with a positive health check.

19. The computer system of claim 15, wherein the program instructions stored on the one or more computer readable storage media, further comprise the steps of:
 deprovisioning the new compute resource responsive to the connection with the client ceasing.

20. The computer system of claim 15, wherein the compute resource is selected from a group consisting of: a virtual server, a container, a cluster of containers, and a cluster of virtual servers.

* * * * *